2,406,440

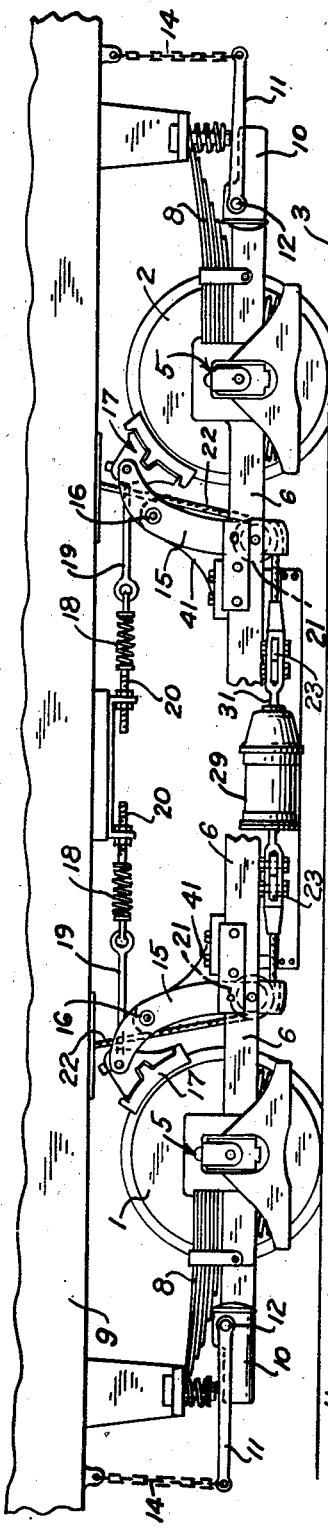
Aug. 27, 1946.     C. H. SAUER     2,406,440
BRAKE
Filed May 8, 1943
INVENTOR.
CHRISTIAN H. SAUER
BY
ATTORNEYS Patented Aug. 27, 1946

UNITED STATES PATENT OFFICE 2,406,440

BRAKE

Christian H. Sauer, Chico, Calif., assignor to
J. T. Alm, Chico, Calif.

Application May 8, 1943, Serial No. 486,174

20 Claims. (Cl. 188—33)

1

This invention relates to brakes in general, and more specifically to a brake and braking system that is applicable to a railway car.

One of the objects of this invention is the provision of an improved braking system in which conventional brake shoes are actuated by hydraulic or pneumatic means and in which system the actuation of said means causes the body of the vehicle or railway car to be pulled in a downward direction when the brakes are applied to thereby stabilize the car with respect to rocking, swaying or bouncing of the body, and to also increase the frictional resistance between the car and the rails or ground.

Another object of the invention is the provision of improved means for more efficiently applying the braking force to the wheels of a railway car through a pneumatic or hydraulic system in which the braking action on a plurality of wheels in a truck at one end of the car or in all of the wheels of the car is equalized.

Other objects and advantages will appear in the drawing and description.

In the drawing,

Fig. 1 is an elevational view of a set of wheels on a railway car showing the invention. Parts are broken away for clarity and only part of the body is shown.

Fig. 2 is a plan view of the wheels and braking elements of Fig. 1, with the body removed, and certain parts being in section.

The set of wheels shown in Figs. 1 and 2 may constitute all the wheels of a single car, such as some of the small street cars now in use, but generally the same principle is involved in the trucks at opposite ends of a car, some of which have three pairs of wheels instead of only two pairs. Such modifications as may be required for different systems do not change the general manner of operation of this invention, hence the illustrations and description are not to be considered restrictive of the invention, but are illustrative thereof instead.

In the drawing, two pairs of wheels 1, 2 are shown on tracks 3, and which wheels may be secured on the ends of axles 4 that are journalled at their ends in conventional journal boxes 5 for rotation of the wheels.

Side frame members 6 connect the wheels 1, 2 at each side of the set, which members may extend between the journal boxes, and cross-frame members 7 extend between the pairs of wheels and connect said side frame members.

Leaf springs 8 between the body 9 of the car and the frame members 6 yieldably support the

2 body on the frame members and wheels. At each end of each side frame member 6 is a shock absorber device 10 that may be of the conventional, hydraulic, single acting type such as shown and described in my co-pending application for patent, Serial No. 482,851, filed April 13, 1943, and which device includes an arm 11 that is spring urged downwardly at its outer end at all times about a pivot point at 12, but which arm is checked in its upward swinging movement by liquid in the shock absorber device. This type of shock absorber in itself is old and well known to those skilled in the art.

The outer end of each arm 11 is connected with the body 9 by a generally vertically disposed chain or cable 14. The use of a flexible connection between each arm 11 and the body is quite important, and such connection may be a chain, cable, or articulated links, provided upward movement of the arm 11 under certain circumstances is permitted, as will later be described.

Adjacent each of the wheels is a generally upwardly extending arm 15 that is pivotally mounted intermediate its ends on a pivot 16. Above each pivot 16, each of said arms carries a brake shoe 17 of substantially the conventional type. Each shoe 17 is pivotally supported on the upper end of each arm and is yieldably held in position away from the wheel, but with its curved wheel-tread engaging surface generally concentric with the wheel, by means of a spring 18. Spring 18 is between rods 19, 20, the former being connected with the brake shoe and the latter being secured to the body 9. Upon pulling the lower end of each arm 15 in direction away from the wheel adjacent thereto, the shoe 17 will be carried into engagement with the wheel-tread, and upon release of the force on the lower end of each arm 15, the shoe will be returned to full line position of Fig. 1 by spring 18 and also the arms 15 will be restored to their positions, as shown in Fig. 1.

On the lower end of each arm 15 is a pulley 21, and a cable 22 that is secured at one end to the body 9, extends downwardly across a side of each pulley and then horizontally to pivotally connect at its opposite end with one end of a link 23. There is a cable for each shoe and the cables that pass over the pulleys that are adjacent wheels 1 are arranged so that their horizontally extending end portions extend toward the similar portions of the cables that pass over the pulleys that are adjacent wheels 2.

There are four links 23 (Fig. 2) arranged in pairs at opposite sides of the vertical mesial plane of the car. The links at said sides extend convergently toward said plane when the brakes are released and their divergent ends are the ones connected to the cables 22. The opposite or convergent ends of the links are pivotally connected to opposite ends of a pair of parallel spaced bars 25. These bars 25 extend at right angles to frame members.

One pair of links 23 at one of the ends of bars 25 are connected intermediate their ends by members 26, each of which may be in the form of a turnbuckle having its opposite screw rods pivotally connected to said links. By turning the buckle of each member 26 in one direction or the other, the ends of said links 23 may be adjusted relative to each other.

Frame members 27, parallel with side-frame members 6, slidably support links 23 while frame members 28 that are also parallel with side-frame members 6, and that extend between cross-frame members 7, slidably support the bars 25.

Between bars 25 is an air or hydraulic cylinder 29 having the conventional piston therein normally positioned adjacent the head of the cylinder with which the fluid pressure line 30 connects for admission of fluid under pressure into the cylinder between said head and piston. A conventional coil spring in the cylinder yieldably holds the piston adjacent said head. This air cylinder piston, and controls therefore are practically as old as air brakes and are familiar to anyone skilled in the art.

Piston rod 31 extending from said cylinder 29 is pivotally connected at its outer end with one of the bars 25 at a point intermediate the ends of the latter, while the head of the cylinder that is normally adjacent the piston is pivotally connected with the other bar 25 as at 32 at a point intermediate the ends of the latter.

The bar 25 with which the cylinder head is connected may be connected with the conventional emergency hand brake (not shown) through the usual connecting mechanism that includes rod 33 (Fig. 2), while a member 34 may extend from the other bar 25 over the frame member 7 that is adjacent thereto. By providing a hook 35 on the outer end of member 34, the emergency brake will function to actuate the brakes independently of the use of compressed fluid in the cylinder 29.

Stops 36 on frame members 28 projecting upwardly therefrom will engage one or more of the links 23 should any one of the cables 22 break or fail to function.

In operation, assuming the car is moving toward the right, as seen in the drawing, and the air is applied through line 30, the head and piston of the cylinder 29 will move apart under equal force. This movement will cause links 23 to pivot on members 26 in a direction for moving their divergent ends toward each other. This latter movement will pull cables 22 at each side of the car toward each other, thereby swinging arms 15 on their pivots to move the shoes 17 into engagement with the wheels 1, 2. At the same time, and proportional to the force applied to the brakes, the cables 22 will pull the body 9 downwardly to stabilize any pitching or rocking of the body, and also to somewhat compress the springs 8. This downward force also serves to increase the frictional resistance between the wheels and the rails to prevent skidding or locking of the brakes and wheels.

From the standpoint of preferred structure, the cylinder 29 should be floatingly supported so that the braking force from the air or fluid in the cylinder may be equally transmitted to the brakes and to the body.

While the use of turnbuckles 26 provides a quick adjustment of the brakes, I preferably provide means for bodily shifting the arms 15 toward or away from the wheels adjacent thereto by means of bolts 40 (Fig. 2) that extend through slots in the bases of the bracket members 41 (Fig. 1) to which said arms are pivotally connected by pivots 16. By loosening said bolts the bracket members may be slipped toward or away from the wheels until the brake shoes are properly positioned relative to the latter. Of course the connections between arms 19 and the brake shoes may also be adjustable so as to change the angularity between the shoes and rods 19 so that the wheel tread engaging sides of the shoes will uniformly engage the treads when brought into engagement therewith.

By positioning the pivots 16 substantially nearer the brake shoes than to the pulleys 21, it will be seen that considerable braking force is applied to the wheels upon pulling the lower ends of the cables 22 through actuation of the links 23.

The application of the brake shoes to the upper half of the wheels I have found to be much preferable in its results than by applying the brakes to the lower half of the wheels where they are ordinarily positioned. This positioning of the brakes provides a more efficient braking action, particularly where a downward force is also transmitted to the body 9.

In the arrangement herein described, the means for pulling the body downwardly is associated with the brakes, but the torque from the rotating wheels does not have any particular effect on the force that pulls downwardly on the body. This principle may be applied to any vehicle having brakes, such as automobiles, trailers, etc., and while not as effective in such latter vehicles as the systems shown in my copending application for patents above mentioned, it does tend to stabilize the body during braking.

The shock absorber elements 10 will be seen to function upon application of the brakes in restricting the objectionable upward movement of the body and rocking or swaying that occurs when brakes are applied. When the body is pulled downwardly by the cables 22, these devices also prevent sudden upward movement of the body when the brakes are released. The arrangement of these elements 10 is also such that the body of the car will not lurch, as at present, when it is started too quickly, and the lurch is also substantially reduced when cars are coupled together, thereby reducing damage from the shifting of loads in the car as well as reducing the wear and tear on cars.

In the claims and description the use of the term "fluid pressure" is intended to include low air pressure such as a partial vacuum, as well as to hydraulic pressure and positive high air pressure above atmospheric pressure.

Having described my invention, I claim:

1. In a wheel mounted vehicle including a spring supported body carried by the wheels and brakes for the latter, a fluid pressure actuated mechanism including an element connected with said brakes and movable in one direction under the influence of said fluid pressure for applying said brakes, a body depressing member connected with said body and with said element, means mounting said member for downward movement upon said movement of said element in said one direction whereby said member will pull downwardly on said body when said brakes are applied by actuation of said fluid pressure mechanism; said element being actuatable by said fluid pressure for applying said brakes and for so moving said member independently of the torque force transmitted to said brakes by said wheels when the latter are rotating and the brakes are applied.

2. In a vehicle having front and rear wheels, axles for said wheels, brakes for said rear wheels, a frame carrying said axles and brakes, a body, and springs yieldably supporting said body on said frame; a fluid pressure actuated mechanism carried by said frame for applying said brakes, and a movable body depressing member connected with said fluid pressure mechanism and said body for pulling said body downwardly against the resistance of said springs upon actuation of said mechanism for applying said brakes, said fluid pressure mechanism including an element supported on said frame for reciprocable movement and said member being connected with said element for movement therewith.

3. In a vehicle having front and rear wheels, axles for said wheels, brakes for said rear wheels, a frame carrying said axles and brakes, a body, and springs yieldably supporting said body on said frame; a fluid pressure actuated mechanism carried by said frame for applying said brakes, and a movable body depressing member connected with said fluid pressure mechanism and said body for pulling said body downwardly against the resistance of said springs upon actuation of said mechanism for applying said brakes, said fluid pressure mechanism including an element supported on said frame for reciprocable movement and said member being connected with said element for movement therewith, said member being a flexible link secured at one of its ends to said element and secured at its opposite end to said body.

4. In a vehicle having front and rear wheels, axles for said wheels, brakes for said rear wheels, a frame carrying said axles and brakes, a body, and springs yieldably supporting said body on said frame; means supporting said brakes for generally oscillatory movement to and from wheel braking position; a fluid pressure actuated member supported on said frame for generally reciprocatory movement connected with said means and with said body for simultaneously causing said oscillatory movement of said brakes in one direction to said position and for drawing said body downwardly against the resistance of said springs upon application of fluid pressure to said member for actuating the latter, fluid pressure means connected with said member for so actuating the latter, and means supporting said member on said frame for downward movement of the portion thereof that is connected with said body when said member is actuated for causing application of said brakes.

5. In a railway car having rail engaging wheels supporting a frame and springs supporting said body on said frame; brake shoes respectively supported on said frame for movement into and out of frictional engagement with the peripheral tread portions of said wheels, a body depressing member secured to said body and extending downwardly therefrom, a fluid pressure actuated element movably supported on said frame and connected with said shoes and with said member for simultaneously moving said shoes into engagement with said tread portions and for moving said member downwardly upon actuation of said element under fluid pressure, and means connecting said brakes and said member to said element for so moving said brakes and said member.

6. In a railway car having rail engaging wheels supporting a frame and springs supporting said body on said frame; brake shoes respectively supported on said frame for movement into and out of frictional engagement with the peripheral tread portions of said wheels, a body depressing member secured to said body and extending downwardly therefrom, a fluid pressure actuated element movably supported on said frame and connected with said shoes and with said member for simultaneously moving said shoes into engagement with said tread portions and for moving said member downwardly upon actuation of said element under fluid pressure, and means connecting said brakes and said member to said element for so moving said brakes and said member, said last mentioned means including an arm pivotally supporting each of said brake shoes for carrying the latter into engagement with said tread portions respectively upon pivoting each arm, and a link connecting one end of said arm to said element and to one end of said member.

7. In a railway car having rail engaging wheels supporting a frame and springs supporting said body on said frame; arms pivotally supported intermediate their ends on said frame at points adjacent said wheels; a brake shoe on one end of each arm movable into engagement with the wheel adjacent thereto upon swinging the opposite end of each arm in one direction; a fluid pressure actuated mechanism connected with said opposite end of each arm for so swinging said latter end, and a link extending downwardly from said body and connected with said mechanism and with said opposite end of each arm adapted to be urged downwardly upon said swinging of said opposite end of said arm for depressing said body against the resistance of said springs simultaneously with application of said brakes.

8. In a railway car having rail engaging wheels supporting a frame and springs supporting said body on said frame; arms pivotally supported intermediate their ends on said frame at points adjacent said wheels; a brake shoe on one end of each arm movable into engagement with the wheel adjacent thereto upon swinging the opposite end of each arm in one direction; said opposite end of each arm extending generally downwardly from the pivot supporting the same; a pulley carried by each arm at its said opposite end; flexible links connected at one of their ends to said body and respectively extending downwardly therefrom and over each of said pulleys and then laterally to fluid actuated elements respectively movable under the influence of fluid pressure for drawing said links against said pulleys whereby said arms will be pivoted to apply the brakes and to simultaneously draw said body downwardly when said elements are so actuated, means securing said links to said elements, and fluid pressure means for so actuating said elements.

9. In a vehicle having axles provided with body supporting wheels thereon, a body, and springs supporting said body on said axles; a frame carried by said axles; brake shoes carried on said frame adjacent said wheels mounted for movement into and out of frictional engagement with the wheels; means securing said shoes to said frame against movement together with said wheels when said shoes are in engagement therewith; a body depressing element secured to said body and adapted to draw said body downwardly against the resistance of said springs upon downward movement of said element; a member secured to said brakes movable in one direction for applying said brakes to said wheels; a power actuated member connected to said element and to said member arranged and adapted to simultaneously move said element downwardly and to move said element in said one direction upon application of power to said member.

10. In a vehicle having axles provided with body supporting wheels thereon, a body, and springs supporting said body on said axles; a frame carried by said axles; brake shoes carried on said frame adjacent said wheels mounted for movement into and out of frictional engagement with the wheels; means securing said shoes to said frame against movement together with said wheels when said shoes are in engagement therewith; a body depressing element secured to said body and adapted to draw said body downwardly against the resistance of said springs upon downward movement of said element; a member secured to said brakes movable in one direction for applying said brakes to said wheels; a power actuated member connected to said element and to said member arranged and adapted to simultaneously move said element downwardly and to move said element in said one direction upon application of power to said member, said brakes being carried on said frame adjacent the uppermost portions of the tread surfaces of said wheels for movement into frictional engagement with the generally upwardly facing parts of said surfaces.

11. In a vehicle having a plurality of pairs of axially aligned wheels, axles supporting said wheels, a body, and springs supporting said body on said axles; brake shoes for the wheels of one adjacent pair thereof supported on said frame for movement into frictional engagement with said wheels; a cylinder and a piston reciprocable thereon positioned between said adjacent pairs of aligned wheels; said cylinder having a closed head at one end, and a piston rod on said piston projecting from the opposite end of said cylinder; means supporting said cylinder for movement thereof opposite to the direction of movement of said piston rod upon admission of fluid under pressure into said cylinder between said head and said piston; means connecting the brake shoes adjacent one of said adjacent pairs of wheels to said cylinder, and means connecting the brake shoes adjacent the other of said adjacent pairs of wheels to said piston rod for simultaneously applying said shoes to said wheels when fluid is admitted into said cylinder; the said means respectively connecting said shoes to said head and to said piston rod being arranged and adapted to apply said brakes when said rod and cylinder are simultaneously moved oppositely.

12. In a vehicle having a plurality of pairs of axially aligned wheels, axles supporting said wheels, a body, and springs supporting said body on said axles; brake shoes for the wheels of one adjacent pair thereof supported on said frame for movement into frictional engagement with said wheels; a cylinder and a piston reciprocable thereon positioned between said adjacent pairs of aligned wheels; said cylinder having a closed head at one end, and a piston rod on said piston projecting from the opposite end of said cylinder; means supporting said cylinder for movement thereof opposite to the direction of movement of said piston rod upon admission of fluid under pressure into said cylinder between said head and said piston; means connecting the brake shoes adjacent one of said adjacent pairs of wheels to said cylinder, and means connecting the brake shoes adjacent the other of said adjacent pairs of wheels to said piston rod for simultaneously applying said shoes to said wheels when fluid is admitted into said cylinder; the said means respectively connecting said shoes to said head and to said piston rod being arranged and adapted to apply said brakes when said rod and cylinder are simultaneously moved oppositely; a flexible connection between said body and said piston rod actuatable by movement of said piston under said fluid pressure for pulling said body downwardly against the resistance of said springs; means mounting said link relative to said piston rod and body for so moving said body.

13. A railway car comprising a spring supported body mounted on rail engaging wheels and air operated brakes for said wheels including generally reciprocable air pressure actuated elements connected with said brakes; links extending downwardly from said body and connected to said elements; means mounting said links for downward movement upon reciprocation of said elements under air pressure for applying said brakes whereby said body will be pulled downwardly upon application of said brakes.

14. A railway car comprising a spring supported body mounted on rail engaging wheels and air operated brakes for said wheels including generally reciprocable air pressure actuated members connected with said brakes; links extending downwardly from said body and connected to said elements; means mounting said links for downward movement upon reciprocation of said elements under air pressure for applying said brakes whereby said body will be pulled downwardly upon application of said brakes, said links including flexible cables; and the means mounting said links for said movement including pulleys over which said cables extend at points respectively positioned between said elements and said body.

15. A railway car comprising a spring supported body mounted on rail engaging wheels and air operated brakes for said wheels including generally reciprocable air pressure actuated members connected with said brakes; links extending downwardly from said body and connected to said elements; means mounting said links for downward movement upon reciprocation of said elements under air pressure for applying said brakes whereby said body will be pulled downwardly upon application of said brakes, means at opposite ends of each car connecting said wheels to said body across the said springs for yieldably resisting relative movement of said body and wheels apart while permitting relative movement of said body and wheels toward each other upon compression of said springs.

16. In a vehicle having a spring supported body carried on pairs of opposed body supporting wheels, brakes for said wheels respectively supported adjacent each of said wheels for generally oscillatory movement to and from said wheels, generally reciprocably supported brake actuating elements connected with said brakes for causing said movement of the brakes upon reciprocation of said elements, a cylinder and piston reciprocable therein respectively connected to said brake actuating elements for said causing reciprocation of the latter upon reciprocating the piston and cylinder relatively by causing fluid pressure changes in the cylinder between one of its heads and said piston, means for causing such changes, and a stop member stationary relative to certain of said elements positioned to limit the movement of the latter in one direction in the event of accidental disconnection of such certain elements with the brakes normally connected therewith.

17. The method of braking a vehicle of the type having body supporting wheels and a spring supported body carried by said wheels that comprises, applying a frictional resistance to the wheels to stop turning thereof and simultaneously therewith pulling downwardly directly on said body against the resistance of the springs supporting the same, said step of pulling said body downwardly being free from the influence of the torque of the wheels to which said frictional resistance is applied.

18. The method of braking a vehicle of the type having body supporting wheels and a spring supported body carried by said wheels that comprises, applying a frictional resistance to the wheels to stop turning thereof and simultaneously therewith pulling downwardly directly on said body against the resistance of the springs supporting the same, said step of pulling said body downwardly being free from the influence of the torque of the wheels to which said frictional resistance is applied, and varying the force of said downward pull in direct proportion to the amount of frictional resistance so applied to said wheels.

19. The method of braking a vehicle of the type having body supporting wheels and a spring supported body carried by said wheels that comprises, applying a frictional resistance to the wheels to stop turning thereof and simultaneously therewith pulling downwardly directly on said body at both ends thereof against the resistance of the springs supporting the same, said step of pulling said body downwardly being free from the influence of the torque of the wheels to which said frictional resistance is applied.

20. The method of braking a vehicle of the type having body supporting wheels and a spring supported body carried by said wheels that comprises, applying a frictional resistance to the wheels at points above their axes of rotation respectively to stop turning thereof and simultaneously therewith pulling downwardly directly on said body against the resistance of the springs supporting the same, said step of pulling said body downwardly being free from the influence of the torque of the wheels to which said frictional resistance is applied.

CHRISTIAN H. SAUER.